(12) United States Patent
Buck, III

(10) Patent No.: US 6,317,980 B2
(45) Date of Patent: *Nov. 20, 2001

(54) LASER JIGGING SYSTEM FOR ASSEMBLY OF TRUSSES AND METHOD OF USE

(75) Inventor: Carl Edward Buck, III, Greenville, SC (US)

(73) Assignee: MiTek Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,914

(22) Filed: Oct. 20, 1997

(51) Int. Cl.$^7$ .................................................. B21D 47/00
(52) U.S. Cl. ................................ 29/897.31; 29/407.04; 29/407.1; 29/467; 29/721; 29/281.3; 33/228; 33/DIG. 21; 269/910; 269/37
(58) Field of Search ................................ 29/897.31, 464, 29/467, 505, 525.01, 407.1, 407.09, 720, 721, 559, 281.3, 407.04; 269/307, 99, 305, 910, 37; 353/28; 703/1; 700/97, 95; 33/16, 228, DIG. 21, 613

(56) References Cited

U.S. PATENT DOCUMENTS

| | | |
|---|---|---|
| 2,212,421 | 8/1940 | Henderson . |
| 2,919,733 | 1/1960 | Johnson . |
| 2,983,292 | 5/1961 | McKinley . |
| 3,241,585 | 3/1966 | Jureit . |
| 3,299,920 | 1/1967 | Koenigshof . |
| 3,421,751 | 1/1969 | Menge . |
| 3,603,581 * | 9/1971 | Christal ........................... 269/307 |
| 3,667,379 | 6/1972 | Templin . |
| 3,826,188 | 7/1974 | Eberle . |
| 4,084,498 | 4/1978 | Weaver . |
| 4,286,778 | 9/1981 | Follmeyer . |
| 4,379,426 | 4/1983 | Thompson et al. . |
| 4,453,705 | 6/1984 | McDonald . |
| 4,463,786 * | 8/1984 | Mellott ........................... 144/133 A |
| 4,514,899 * | 5/1985 | Burger ........................... 29/721 |
| 4,514,901 | 5/1985 | Kirby . |
| 4,567,821 | 2/1986 | McDonald . |
| 4,627,564 | 12/1986 | Bowser . |
| 4,650,106 | 3/1987 | Branaman . |
| 4,669,184 | 6/1987 | Castillo . |
| 4,711,437 | 12/1987 | Longenecker et al. . |
| 4,819,475 | 4/1989 | Irvello . |
| 4,875,666 * | 10/1989 | Hain ........................... 269/37 |

(List continued on next page.)

FOREIGN PATENT DOCUMENTS

| | | |
|---|---|---|
| 195 11 827 C1 | 4/1996 | (DE) . |
| WO 94/11151 | 5/1994 | (WO) . |
| WO 97/16280 | 5/1997 | (WO) . |

OTHER PUBLICATIONS

Virtek, TrussLine Projected Profits, brochure.

Primary Examiner—S. Thomas Hughes
Assistant Examiner—T. Nguyen
(74) Attorney, Agent, or Firm—Senniger, Powers, Leavitt & Roedel

(57) ABSTRACT

A method of constructing trusses includes providing a laser jigging system that projects the location of the jigging hardware so that an operator can easily, quickly, and precisely position the jigging hardware on the work-surface prior to positioning any truss members on the work-surface is described. More particularly, the system projects puck and other jigging hardware alignment or location guides on the table work-surface. With the alignment guides projected on the table, the pucks and other jigging hardware are located in alignment with the projected guides, and secured to the table. The truss members are located on the table in accordance with the pattern defined by the jigging, and connector plates are then engaged with the truss members.

15 Claims, 4 Drawing Sheets

U.S. PATENT DOCUMENTS

| | | |
|---|---|---|
| 4,943,038 | 7/1990 | Harnden . |
| 4,971,413 * | 11/1990 | Inoue ................................... 350/6.8 |
| 4,998,336 | 3/1991 | Papsdorf . |
| 5,046,015 * | 9/1991 | Dasher et al. ................. 364/474.09 |
| 5,085,414 | 2/1992 | Weaver . |
| 5,092,028 | 3/1992 | Harnden . |
| 5,148,591 * | 9/1992 | Pryor ..................................... 29/407 |
| 5,211,108 | 5/1993 | Gore et al. . |
| 5,342,030 | 8/1994 | Taylor . |
| 5,385,339 | 1/1995 | Williams . |
| 5,387,969 * | 2/1995 | Marantette ........................... 356/4.5 |
| 5,388,318 | 2/1995 | Petta . |
| 5,430,662 | 7/1995 | Ahonen . |
| 5,569,004 * | 10/1996 | Marantette ........................... 409/235 |
| 5,646,859 * | 7/1997 | Petta et al. ..................... 29/897.312 |
| 5,702,095 | 12/1997 | Williams . |
| 5,837,014 * | 11/1998 | Williams ............................. 29/401.1 |
| 6,170,163 | 1/2001 | Bordignon et al. . |

* cited by examiner

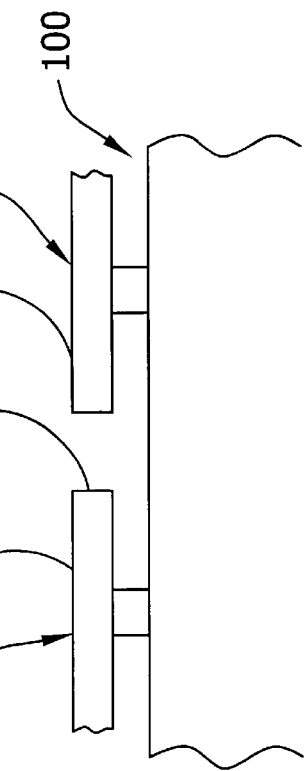
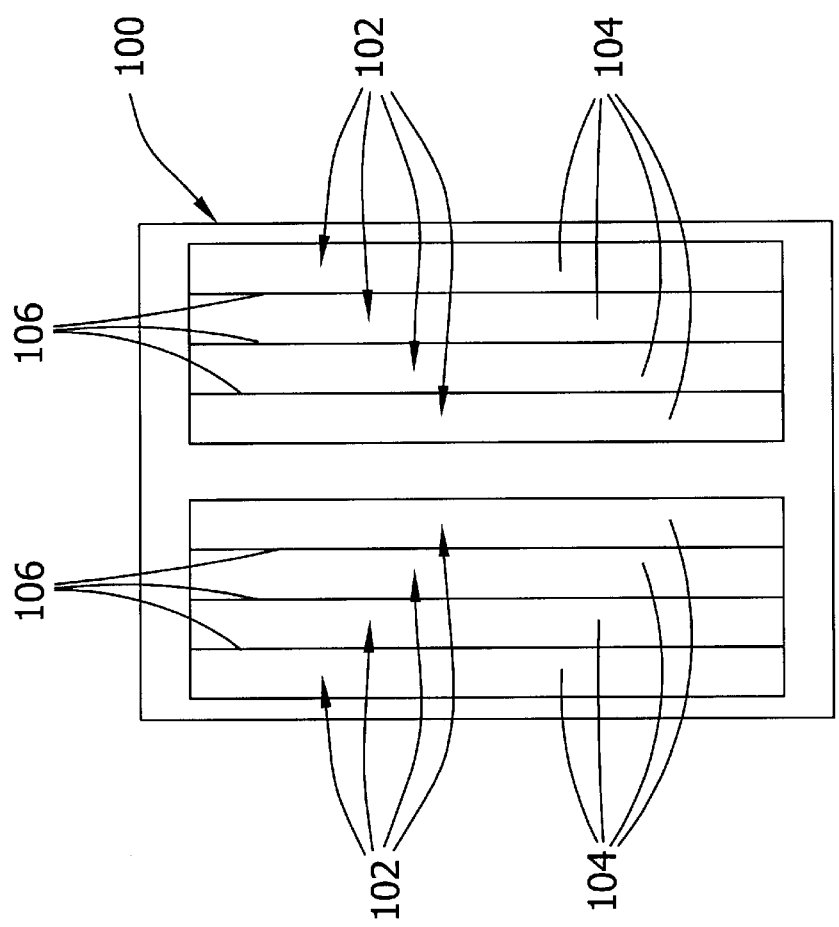
FIG. 1B
FIG. 1A

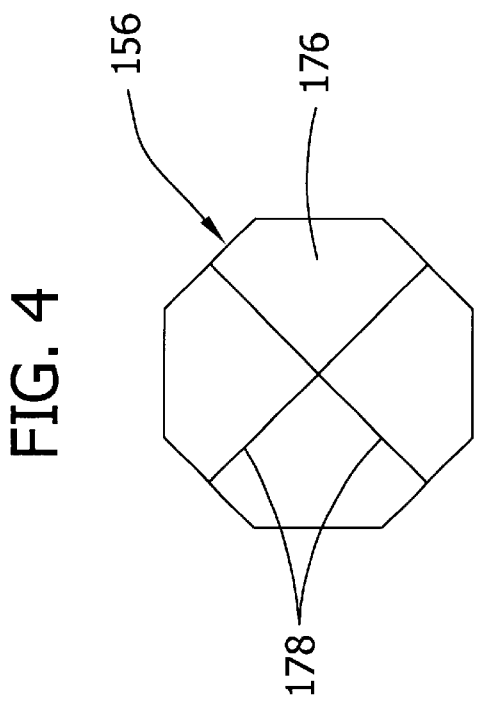
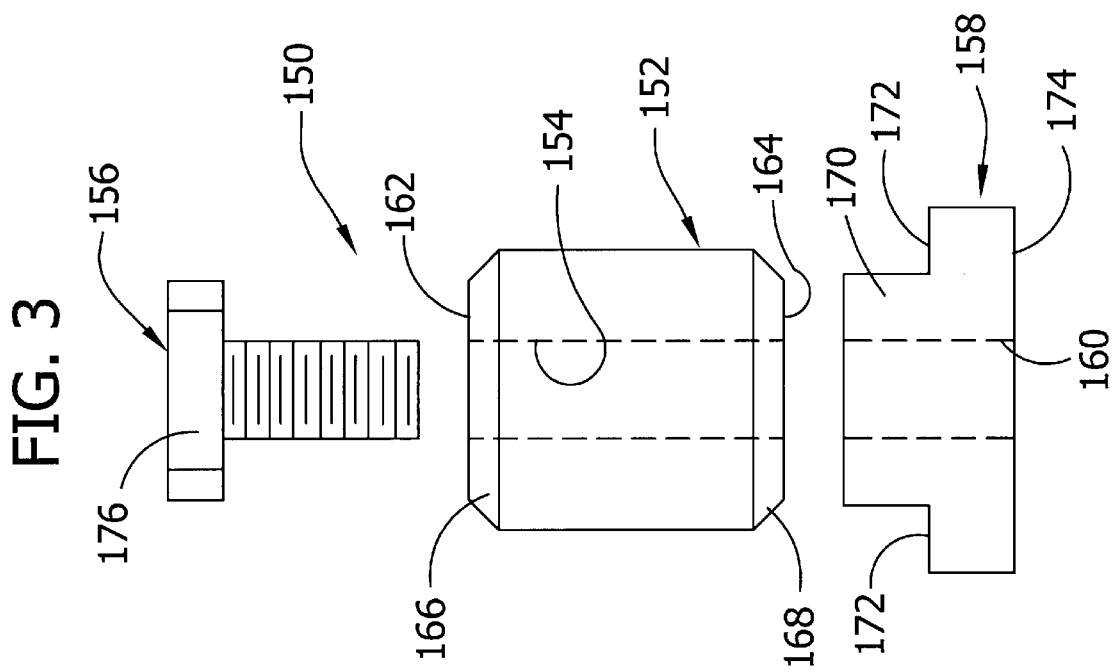

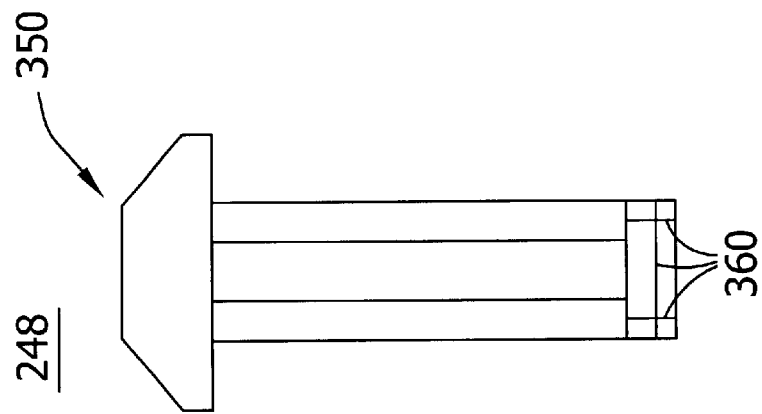
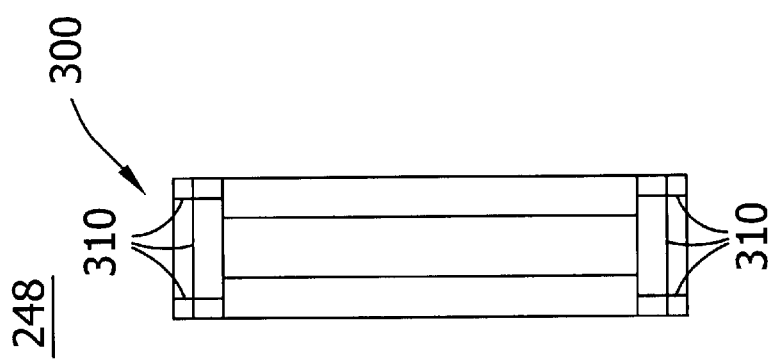
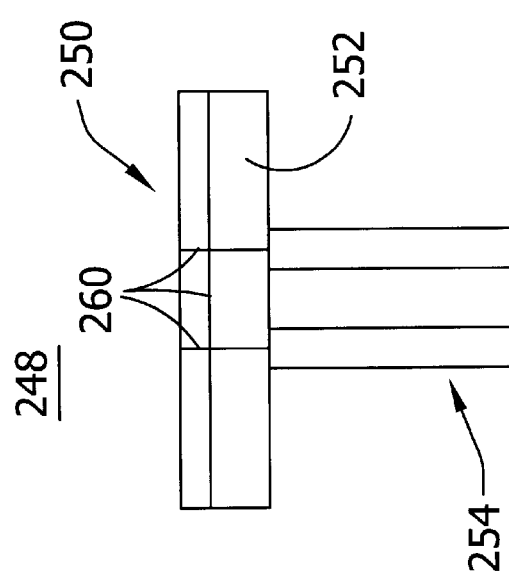

LASER JIGGING SYSTEM FOR ASSEMBLY OF TRUSSES AND METHOD OF USE

FIELD OF THE INVENTION

This invention relates generally to assembling trusses and, more particularly, to methods and apparatus for facilitating the set-up of trusses for factory assembly.

BACKGROUND OF THE INVENTION

Prefabricated trusses are often used in the construction of buildings because of their strength, reliability, low cost, and ease of use. The trusses are typically assembled in factories using automated machinery and large jig tables, and then shipped to construction sites for installation.

One known method for the assembly of trusses includes positioning truss members on the work-surface of a table within outlines projected upon the work-surface by an overhead laser light projection system. One such laser system is described in U.S. Pat. No. 5,388,318. An operator then moves jigging hardware into engagement with the truss members laid-out upon the work-surface to securely hold the members in place for subsequent assembly, e.g., embedding connector plates into the truss members to form the truss.

Using known laser systems, an operator typically sets-up a first portion of a truss upon a table work-surface and then secures the jigging hardware in place for that first portion. Once the first portion of the truss is secured by the jigging hardware, the remaining portions of the truss are sequentially set-up and secured, typically in a clockwise or counterclockwise order. This set-up approach is utilized because if the jigging hardware is incorrectly set-up for one portion of the truss, then the set-ups for all subsequently laid-out portions of the truss may be incorrect and have to be scrapped. By sequentially setting-up and securing the set-ups for the portions of the truss, the likelihood of having to scrap an entire set-up is reduced.

After fabricating one complete truss, the truss is removed from the work-surface and another truss of the same configuration can be assembled using the same jigging hardware set-up. Specifically, new truss members are positioned on the table according to the location of the jigging hardware, although the jigging hardware may require minor adjustment from one truss set-up to the next to ensure that the truss members are securely held in place.

The known laser projection systems greatly enhance the speed and precision of, and simplify, the set-up of truss members for factory assembly, as compared with manual systems and methods which depend upon the operator experience and knowledge in setting-up jigging hardware for truss fabrication. However, it would be desirable to provide a laser system and method which even further simplifies and speeds up the fabrication of trusses. It would also be desirable to provide a system and method which further reduces reliance upon operator experience and knowledge in setting up jigging hardware for truss fabrication.

SUMMARY OF THE INVENTION

These and other objects may be obtained by a laser jigging system that projects the location of the jigging hardware on the work-surface so that an operator can easily and quickly position the jigging hardware on the work-surface prior to positioning any truss members on the work-surface. More particularly, and rather than simply projecting an image of the truss members on the work-surface as with known laser projection systems, the subject laser projection system projects puck and other jigging hardware alignment or location guides on the table work-surface at predetermined locations offset from where the component members of the truss will be laid-out for assembly. With the puck and other jigging hardware alignment guides projected on the table, the jigging hardware, which preferably carry complimentary alignment guide means thereon, can be properly located on the table in any desired sequence and secured in place. The truss members can then be located on the table in accordance with the pattern defined by the pucks and other jigging, and connector plates can then be engaged with the truss members.

The above-described system provides the important advantage that the puck and jigging set-up will be exactly in accordance with the engineering specifications for the particular set-up. In addition, an operator can be quickly trained on using the system to provide the desired set-ups. Also, use of the subject system may significantly reduce fabrication costs by reducing the time and thereby the labor costs associated with truss set-up and by increasing throughput.

BRIEF DESCRIPTION OF THE DRAWINGS

FIG. 1A is a top view of a slotted top gantry table utilized in truss fabrication.

FIG. 1B is an end view of the gantry table top shown in FIG. 1A.

FIG. 3 is an exploded view of a puck assembly in accordance with one embodiment of the present invention.

FIG. 4 is a top view of the bolt shown in FIG. 3.

FIG. 5 is a top view of a T-stop.

FIG. 6 is a top view of a straight stop.

FIG. 7 is a top view of a heel stop.

DETAILED DESCRIPTION

Figure 2:
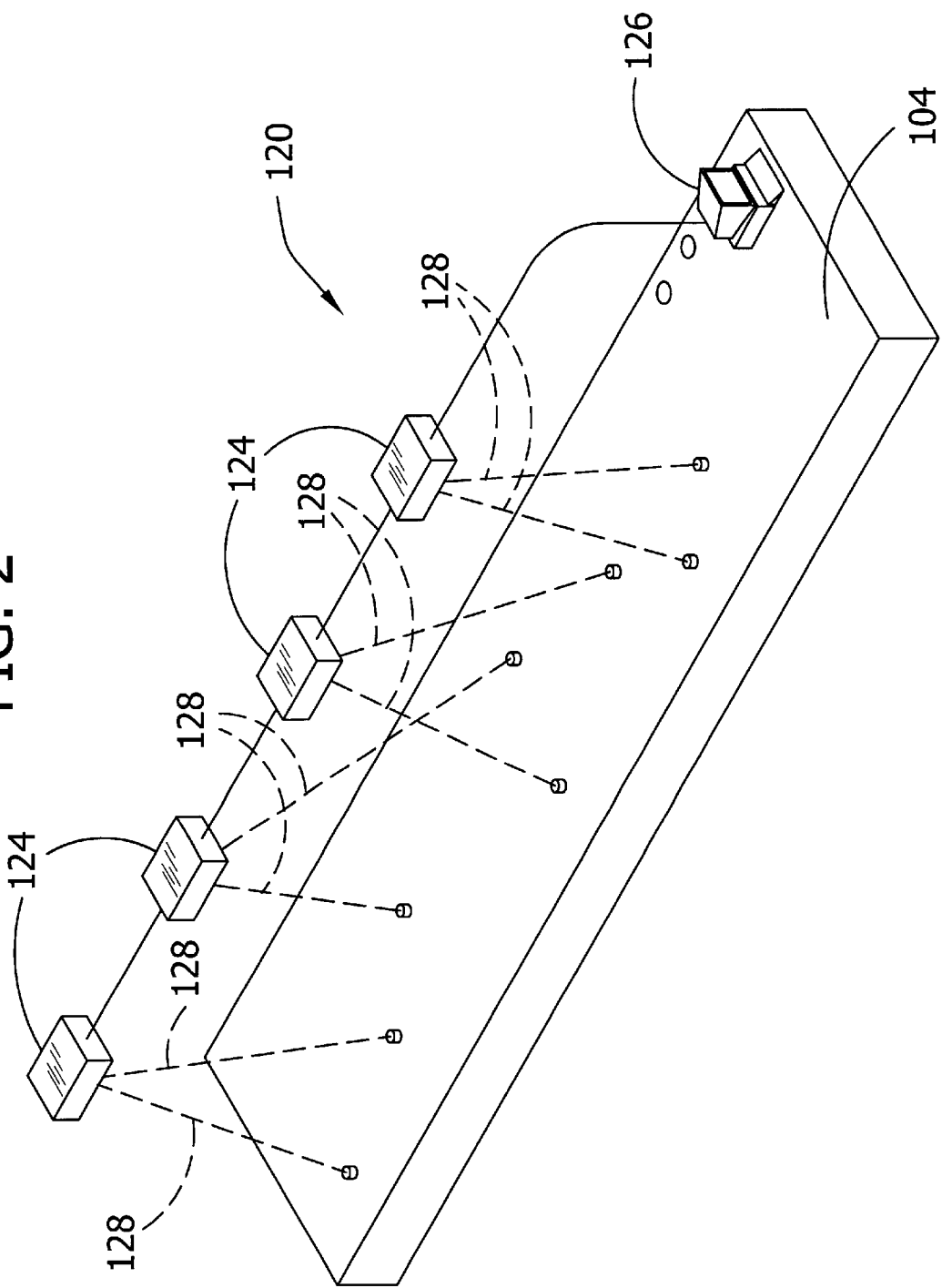
FIG. 2 is a perspective view of a laser projection system in accordance with one embodiment of the present invention.

The present invention is described below in connection with fabricating trusses on a slotted table. Although specific embodiments of the invention are described below, the present invention is not limited to practice in connection with a slotted table or any particular slotted table, nor is the present invention limited to fabricating any particular truss. Rather, the present invention can be utilized with many different tables to fabricate many different types and configurations of trusses.

In addition, the present invention is described herein in connection with a modified form of a laser projection system commercially available from Virtek Vision Corporation, Waterloo, Ontario, Canada, N2L 5J2, which is described in U.S. Pat. No. 5,388,318 issued Feb. 14, 1995, which is incorporated herein, in its entirety, by reference. Although a specific laser projection system is referenced, it is contemplated that many other existing laser projection systems can be modified in accordance with the present invention.

More particularly, and in accordance with the present invention, a known laser projection system such as the above-referenced Virtek system is modified to project puck and other jigging hardware alignment or location guides on the table work-surface at predetermined positions corresponding to the desired puck and jigging hardware locations for the truss set-up. These projected alignment or location guides are offset from where the members of the truss will be laid-out for assembly. The projected alignment or location guides may include various configurations depending upon the shape and size of puck or other jigging hardware to be positioned, and the jigs preferably carry complimentary guide or locator means thereon to facilitate precise alignment of the jigging hardware with the projected guide indicators. For example, a cylindrical puck may be quickly and precisely positioned with projected guides which define a single point on the work-surface and complimentary guide means which mark the center of the top surface of the puck, e.g., a notch machined into the puck top surface or a marking. However, a non-cylindrical jig, e.g., a T-stop, requires projected alignment guide indicators and complimentary guide means, e.g., machined grooves, or notches, or markings, which each define at least two points in order to properly locate and orient the jig with respect to the table and truss members to be set-up thereon. In addition to projecting alignment guides for the pucks and jigging hardware the subject laser system may also project all or a portion of the truss image, e.g., an outline of the truss members or connector plates or other assembly information.

Referring to FIG. 1A, which is a top view of an exemplary slotted top gantry table 100 commonly utilized in truss fabrication, the table 100 includes adjacent table portions 102 which together define a substantially planar upper surface 104. The surface 104 is generally referred to herein as the work-surface of table 104. The table portions 102 are spaced apart and form slots 106 (best shown in FIG. 1B) in which jigging hardware may be moved and temporarily secured relative to the work-surface 104 for the fabrication of trusses. Such slotted tables are well known and are commercially available from, for example, MiTek Industries, Inc. of St. Louis, Mo.

As shown in FIG. 2, the laser projection system 120 includes one or more projectors 124 and a controller 126. The controller 126 is preferably operatively connected to receive configuration data regarding the geometry and connections of the truss to be set-up from a second computer (not shown), as more fully described in U.S. Pat. No. 5,388,318. In accordance with one aspect of the present invention, projectors 124 project alignment or location guides 128 upon the work-surface 104. The controller 126 controls the location of the guides 128 and may, for example, be a microcomputer.

FIG. 3 is an exploded view of an exemplary puck assembly 150 in accordance with one embodiment of the present invention. The puck assembly 150 includes a substantially cylindrical shaped puck 152 having a bore 154 extending there-through, a bolt 156 for extending through the puck bore 154, and a nut 158 for threadedly engaging the bolt 156. The puck 152 is preferably fabricated from casehardened steel and coated with a black oxide.

As best seen in FIG. 4, the bolt 156 includes a head 176 which preferably carries guide means 178 thereon. In the illustrated case, the guide means 178 are shown as cross hairs etched into the upper surface of the bolt-head 176. However, those skilled in the arts will appreciate that various other forms of guide means can be suitably used for precisely aligning the cylindrical pucks 150 with the projected alignment or locator guides 128. As used herein, the term guide means includes, for example, cross hairs, a single dot, a special character, and a special shape, machined into, painted, or otherwise disposed, e.g., adhesively, on head 176.

The nut 158, for example a T-nut, is sized to be inserted into the slot 106 (FIG. 1B) between adjacent table portions 102. Tightening of the bolt 158 draws the nut 158 into tight contact with an underside surface of the table portions 102 and the puck 152 against the work-surface 104 to maintain the puck assembly 150 in a desired location in the slot 106.

To modify a known laser projection system for use with the puck assembly 150, such known systems would be configured to project alignment or location guides 128 at predetermined locations and orientations off-set from where the truss members are to be laid-out upon the work-surface 104 for assembly. The offset locations and or orientations are dependent upon the size and shape of the jig fixture to be used at each given location. Such modification of known systems is a straight forward addition to the known software of such projection systems, and such modification may be used by itself or in combination with the projection of the desired truss member configuration on the work-surface.

Set forth below is a description of other jigging hardware, sometimes referred to herein as stops or jigs 248, utilized in connection with locating truss members on a work-surface of a slotted table. Puck assembly 150 described above is a particular type of jig 248, and although additional specific jigs are described below, it should be understood that many alternative jig configurations could be utilized to secure truss members on the work-surface in accordance with the present invention.

More particularly, FIG. 5 is a top view of a T-stop 250. The T-stop 250 includes a stop member 252 and a slide 254 extending from the stop member 252. Guide means such as indicators 260 are provided on the stop member 252 and may be brought into alignment with complimentary, guide indicators projected by the laser projection system 120. Indicators 260 are grooves machined into stop member 252, and the grooves may be painted to have a color distinct from the color of the guide indicators projected by system 120 to facilitate ascertaining when proper alignment is achieved. Similarly, as shown in FIGS. 6 and 7, straight stops 300 and heel stops 350 include respective guide means 310 and 360 to facilitate alignment with guide indicators projected by the laser system 120. The T-stops 250, straight stops 300, and heel stops 350 are utilized for various purposes in fabricating a truss. For example, the T-stops 250 typically are utilized at ends of chords, and the straight stops 300 are utilized along a length of the chord particularly at a splice location. Heel stops 350 typically are utilized to locate a heel position of a bottom chord.

To fabricate a truss using the above-described system, the laser projection system is activated to project laser alignment or location guides 128 on the work-surface 104. Each guide 128 represents a location of a puck assembly 150 or other jig or stop fixture 248. The puck assemblies 150 are positioned so that the guide means 178 thereon are in alignment with location guides 128. Specifically, the puck assembly 150 is positioned on the work-surface 104 by sliding the puck 152 along the slot 104 until alignment guides 128 and guide means 178 are aligned. The puck assembly 150 is then secured by tightening bolt 156. The described process is then repeated for each puck assembly 150. In addition to positioning each puck assembly 150, the stops 248, including stops 250, 300, and 350, are located and aligned with the projected alignment guides 128 and secured. Specifically, the stops 248 are positioned on work-surface 104 so that alignment guides 128 and stop-guide means 260 are aligned. Care must be taken to align all aspect of projected alignment guides 128 and guide means 260 to assure that the stops 248 are correctly positioned and properly orientated with respect to the work-surface 104 of table 100. The stops 248 are then secured in a manner similar to the puck assemblies 150. The truss members are then placed on the work-surface 104 in the area defined by the puck assemblies 150 and the stops 248. Connector plates are then positioned over the truss member interfaces and pressed into the truss members using, for example, a vertical or roller press.

The above-described system provides the important advantages that the puck and jigging set-up will be exactly in accordance with the engineering specifications for the particular set-up and very little, if any, operator interpretation is required for such set-up, even for complex set-ups. In addition, an operator can be quickly trained on using the system to provide the desired set-ups. Further, the pucks and jigging are securely held in place on the work-surface and, therefore, a particular set-up can be reused without much need for resetting the pucks and jigging. Also, use of the subject system will expectedly result in significant cost reductions in the fabrication of factory assembled trusses by reducing the time, labor and training required for multiple or complex truss jig set-ups and, thereby, increasing through put.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only the terms of the appended claims.

What is claimed is:

1. A method for assembling a truss on a work-surface, the truss comprising truss members arranged relative to each other in a predetermined pattern, the method comprising the steps of:
    projecting a pattern of jig fixture location guides onto the work-surface at locations offset from locations at which truss members are to be placed on the work-surface according to the predetermined pattern of truss members;
    mounting jig fixtures on the work-surface at the locations indicated by the projected pattern of jig fixture location guides, the jig fixtures being configured for locating the truss members to be placed on the work-surface according to the predetermined pattern of the truss members;
    placing the truss members on the work-surface within the jig fixtures; and
    connecting the truss members to form the truss.

2. A method as set forth in claim 1 wherein each jig fixture has guide markings thereon, the jig fixture location guides comprising projected guide markings, the step of mounting the jig fixtures on the work-surface comprising positioning the jig fixtures on the work-surface such that the guide markings of the jig fixtures are in registry with the guide markings of the jig fixture location guides projected onto the work-surface.

3. A method as set forth in claim 2 wherein the jig fixtures are selected from a group comprising pucks, T-stops, straight stops and heel stops.

4. A method as set forth in claim 2 wherein the jig fixtures are mounted on the work-surface using nuts and bolts, the work-surface having a plurality of the slots, the step of positioning the jig fixtures on the work-surface comprising sliding the jig fixtures along the work-surface generally within the slots such that the guide markings of the jig fixtures are in registry with the guide markings of the jig fixture location guides projected onto the work surface and tightening the nuts and bolts to secure the jig fixtures against further movement relative to the work-surface.

5. A method as set forth in claim 1 wherein the jig fixture location guides are projected onto the work-surface by a laser projection system.

6. A method as set forth in claim 1 further comprising the steps of locating connector plates at interfaces between truss members and engaging the connector plates with the truss members to connect said truss members.

7. A method as set forth in claim 6 wherein the step of engaging the connector plates with the truss members comprises pressing the connector plates into the truss members.

8. A method as set forth in claim 7 wherein the connector plates are pressed into the truss members using a roller press.

9. A method as set forth in claim 1 further comprising the step of projecting images of truss members onto the work-surface at locations in accordance with the predetermined pattern of truss members while the pattern of jig fixture location guides is projected onto the work-surface.

10. A method for assembling a truss on a work-surface, the truss comprising truss members arranged relative to each other in a predetermined pattern, the method comprising the steps of:
    projecting a pattern of jig fixture location guides onto the work-surface;
    mounting jig fixtures on the work-surface at the locations indicated by the projected pattern of jig fixture location guides, the jig fixtures having guide markings thereon and being configured for locating the truss members to be placed on the work-surface according to the predetermined pattern of truss members, the step of mounting said jig fixtures on the work-surface comprising positioning the jig fixtures on the work-surface such that the guide markings of the jig fixtures are in registry with the jig fixture location guides projected onto the work-surface;
    placing the truss members on the work-surface within the jig fixtures; and
    connecting the truss members to form the truss.

11. A method as set forth in claim 10 the jig fixtures are selected from a group comprising pucks, T-stops, straight stops and heel stops.

12. A method as set forth in claim 11 wherein the jig fixtures are mounted on the work-surface using nuts and bolts, the work-surface having a plurality of the slots, the step of positioning the jig fixtures on the work-surface comprising sliding the jig fixtures along the work-surface generally within the slots such that the guide markings of the jig fixtures are in registry with the guide markings of the jig fixture location guides projected onto the work surface and tightening the nuts and bolts to secure the jig fixtures against further movement relative to the work-surface.

13. A method as set forth in claim 10 wherein the guide markings of the jig fixtures are cross-hairs.

14. A method as set forth in claim 10 wherein the guide markings of the jig fixtures comprise at least two grooves in each jig fixture.

15. A method as set forth in claim 10 further comprising the step of projecting images of truss members onto the work-surface at locations in accordance with the predetermined pattern of truss members while the pattern of jig fixture location guides is projected onto the work-surface.

* * * * *